United States Patent [19]

Swanson et al.

[11] 4,333,534
[45] Jun. 8, 1982

[54] AGRICULTURAL TOOL CARRIER

[76] Inventors: Guy J. Swanson, S. 4305 University, Spokane, Wash. 99206; Morton C. Swanson, Rte. 1, Palouse, Wash. 99161

[21] Appl. No.: 174,841

[22] Filed: Aug. 4, 1980

[51] Int. Cl.³ .............................................. A01C 5/00
[52] U.S. Cl. ................................... 172/464; 172/483; 172/675; 172/671; 111/85
[58] Field of Search ............... 172/464, 671, 657, 483, 172/166, 474, 624, 675, 619, 630, 620, 657, 661; 111/85, 52, 12, 55, 13, 62, 14; 16/102, 99, 106

[56] References Cited

U.S. PATENT DOCUMENTS

| 581,966 | 0/1897 | Todd | 111/62 |
|---|---|---|---|
| 1,186,309 | 6/1916 | Hackney | 172/657 X |
| 2,807,058 | 9/1957 | Morgan | 16/106 |
| 3,507,233 | 4/1970 | Greig | 172/575 X |
| 3,611,956 | 10/1971 | Moore | 111/62 |
| 3,749,035 | 7/1973 | Cayton | 172/413 |
| 4,044,697 | 8/1977 | Swanson | 172/464 |
| 4,116,140 | 9/1978 | Anderson | 111/85 |
| 4,227,581 | 10/1980 | Klotzbach | 172/142 |

FOREIGN PATENT DOCUMENTS

| 217964 | 1/1910 | Fed. Rep. of Germany | 111/52 |
|---|---|---|---|
| 601267 | 11/1925 | France | 172/483 |
| 710209 | 6/1954 | United Kingdom | 172/624 |

Primary Examiner—Richard J. Johnson
Attorney, Agent, or Firm—Wells, St. John & Roberts

[57] ABSTRACT

Individual tool bars are mounted between upright guides of a horizontal rectangular frame. Rollers engaging the guides transmit longitudinal forces from the frame to the tool bars and allow the tool bars to move freely up and down. Ground working tools mounted to the bars can therefore "walk" over uneven terrain as controlled by balancing depth wheels and packer wheels. Hydraulic cylinders are mounted between the tool bars and frame for applying upward or downward force against the tool bars without inhibiting their free movement along the guides in response to ground contour.

4 Claims, 5 Drawing Figures

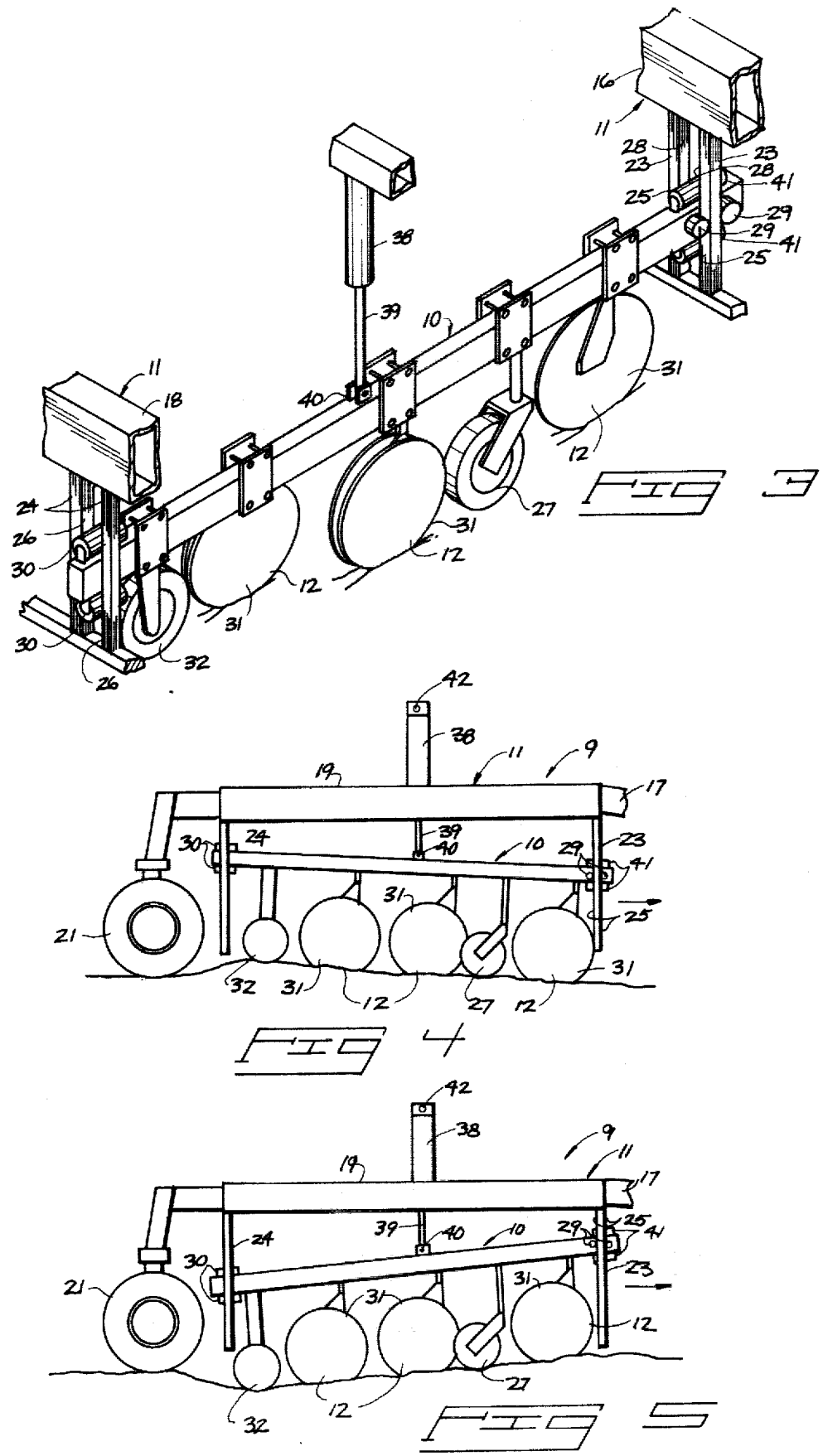

AGRICULTURAL TOOL CARRIER

BACKGROUND OF THE INVENTION

The present invention relates to ground working tool carriers, especially those having multiple tool bars that move independently relative to one another over uneven ground surfaces.

Modern powerful farm tractors have substantially increased capability over older style equipment for pulling increased loads. This extra capability permits a much wider swath to be covered by ground working implements. Variations in soil conditions across this width present a problem where individual implements must each be precisely controlled for depth of operation, as in the case of seed drills. It is therefore desirable to provide independent control for each seed planting element and to accommodate varying terrain contour or soil hardness across the width of the swath taken by the drill. These features are especially important in "no till" farming, where both soil preparation and planting of seed are accomplished during one pass of the farm equipment.

No till farming is a relatively new method where stubble from a crop remains uncultivated during a subsequent planting and growing season. The new crop is simply planted through the stubble of the previous season's crop.

Special seed drills have been designed for this method of planting crops. An example of such a drill is discussed in U.S. Pat. No. 4,044,697. There, a heavy frame supports a seed and fertilizer hopper above a series of pivoted disc pairs. Seeds are deposited between the rotating discs and planted in furrows produced by the discs as the drill is pulled over the previous crops's stubble. A hydraulic system is provided for the pairs of discs to force the discs downwardly about an axis that is fixed relative to the carrying frame. The discs will therefore move on a radius to the pivot axis.

While this arrangement has functioned well, it is relatively inflexible as to the types and numbers of implements it can accommodate. Furthermore, only a single ground working tool can be mounted on each tool support bar due to the resulting angular movement of the bar about the fixed pivot point. Elevational movement of the ground working tool relative to the remaining tools along the length of the bar is dependent upon the radial distance to the pivot axis. Such a relationship would not be workable in uneven terrain. Additionally, downward forces applied to one ground working element cannot be as easily applied to several elements mounted along a single tool bar pivoted on a single axis. The forces applied to the several elements would vary with their relative distances from the pivot axis.

U.S. Pat. No. 3,507,233 to J. D. Greig et al discloses a seed drill making use of two ground working tools and a depth control wheel spaced longitudinally along a tool bar pivoted on a transverse horizontal axis at a forward end. The pivoted arrangement for the tool bar would not allow proper maintenance of the operating depth control in rough terrain. For example, if the implement were to approach a relatively sharp rise in the ground surface, the front implement would gouge into the elevated soil to a depth greater than the operating depth set by the trailing depth control wheel. In fact, the forward wheel could lift the entire tool bar rearward of the first ground engaging tool from the ground surface. Proper depth control would be available only when the rearward depth control wheel regains contact with the ground surface. Similar situations can occur as an abrupt dip is confronted by the forwardly moving implement. The leading ground engaging tools would either substantially decrease their operating depth or rise to an elevation above ground level until the trailing depth setting wheel descended into the recessed area. Then, the tools would either seek the prescribed depth or gouge deeply into the opposite raised side of the recess.

U.S. Pat. No. 3,749,035 to Cayton discloses a seed planter with multiple ground working tools mounted to independently pivoted longitudinal tool bars. The tool bars are attached to the main tool frame by a parallelogram linkage. The linkage causes the tool bar to remain parallel to the ground surface. This arrangement, as well as the other single pivot tool bars, might function well on level ground where the terrain is relatively smooth, but cannot operate efficiently on rough or rolling terrain. Tool frame movement might cause the tool bars to swing to orientations that have not yet been encountered by the respective trailing ground working tools. The ground engaging tools are therefore unable to effectively change position in response to terrain changes encountered by the tool bar.

The present tool bar suspension permits the mounting of several ground working tools arranged along parallel lines on multiple independently suspended tool bars. The tools can be mounted or removed at will and can also be shifted in position along the bar length. The tools mounted on one bar are free to move elevationally over terrain independently of the tools mounted on the remaining tool bars. Movement of the individual bars is controlled by their direct engagement with the terrain encountered by them. Downward forces or loading can be exerted against the tool bars without affecting their free "floating" function. The tools will therefore "walk" over uneven terrain regardless of the dowward pressure applied to them. The "walking" relationship of the floating tool bars to the general frame assures constant, precise depth control.

BRIEF DESCRIPTION OF THE DRAWINGS

FIG. 3 is a fragmentary pictorial view of a single tool bar and associated frame;

FIG. 4 is an operational view of the tools being drawn along an uneven ground surface; and FIG. 5 is a view similar to FIG. 4, showing a different operational relationship of the components.

DETAILED DESCRIPTION OF A PREFERRED EMBODIMENT

Figure 1:
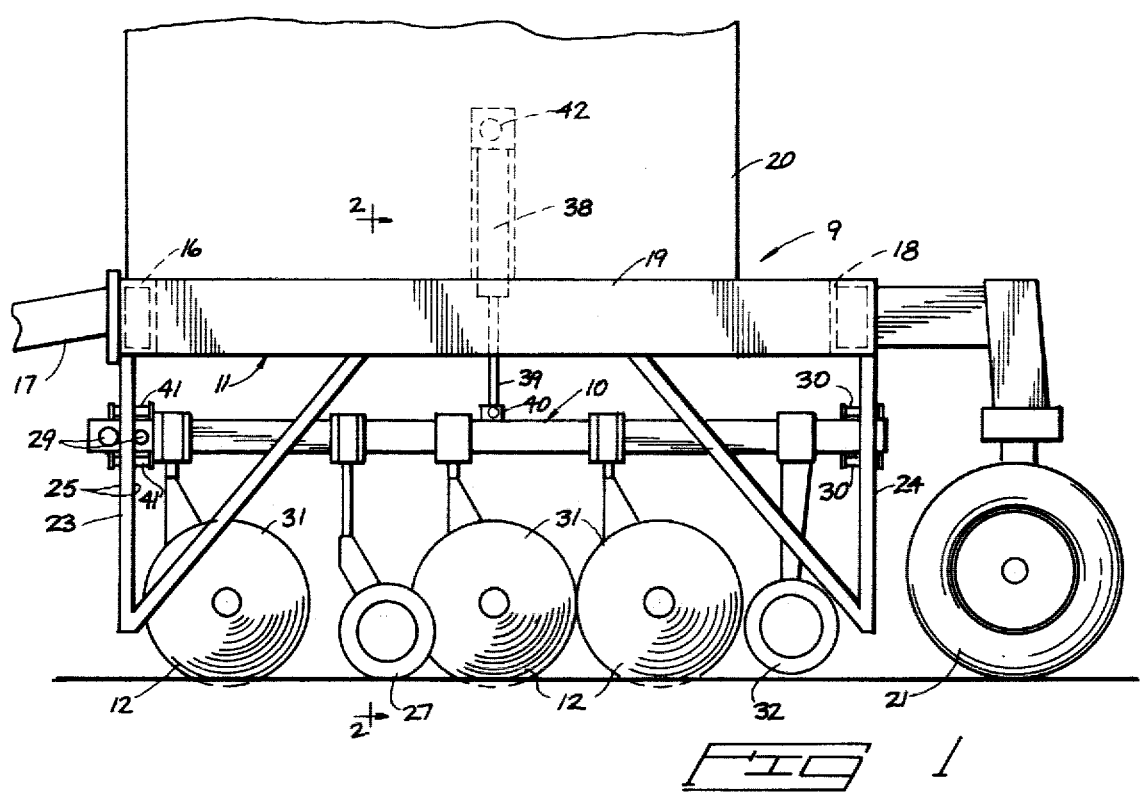
FIG. 1 is a fragmented end elevation of the present tool carrier.
Figure 2:
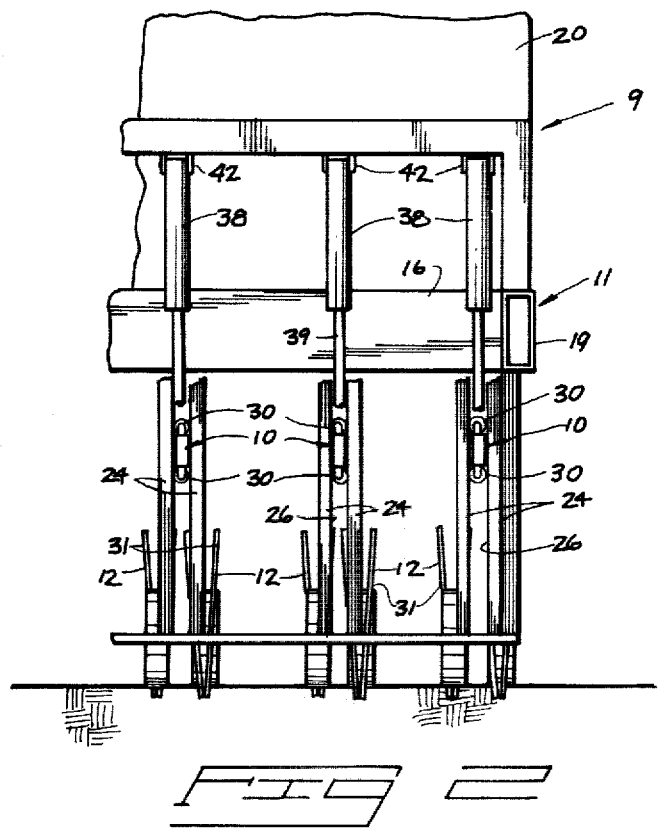
FIG. 2 is a fragmentary sectional view taken on line 2—2 in FIG. 1.

The present tool carrier is generally identified in the accompanying drawings by reference numeral 9. It includes a rigid supporting framework 11. A plurality of ground working implements or tools 12 are fixed along a plurality of tool bars 10 mounted to framework 11 for free vertical movement relative to one another in response to varying ground terrain. Framework 11 may be tractor drawn, as illustrated, or may be self-propelled. The tools along each tool bar are free to move elevationally in response to soil contour and resistance to penetration, as well as varying balanced forces applied between the framework and tool bar and opposing forces applied in upward directions by forward depth control wheels and rear packing wheels.

The illustrated framework 11 is generally rectangular in configuration and includes a transverse rigid front frame member 16 connected to a longitudinal drawbar 17. The drawbar may be connected to a standard farm tractor. A rear frame member 18 is longitudinally spaced from the front frame member 16 and is parallel to it. Longitudinal sides 19 connect the ends of the front and back frame members 16 and 18 (FIG. 3).

The rigid frame 11 is adapted to receive and support standard supply tanks 20 for seeds, fertilizer or other materials, whether dry or liquid. Various dispensing mechanisms can lead from the tanks to ground working tools 12 fixed along the individual tool bars 10.

A transverse row of transport wheels 21 are provided at the rear of the frame 11 to support the frame and tools for travel when the tools are in an elevated non-operative position.

The transport wheels 21 support frame 11 at its back frame member 18 while the front frame member 16 may be supported by the tractor and drawbar 17. The tool bars 10 are suspended longitudinally on frame 11 between the transport wheels 21 and drawbar 17 for free elevational "floating" motion relative to frame 11 as the unit is moved along a field area during use of tools 12.

A set of upright guides 23 is suspended from the front frame member 16. A similar set of upright guides 24 is suspended from the back frame member 18. The front guides 23 provide upright transverse surfaces 25 that are parallel to one another, as well as parallel upright longitudinal surfaces 28. The back guides 24 include upright longitudinal surfaces 26 that are upright and parallel. The transverse surfaces 25 are located transversely adjacent to opposite sides of the forward tool bar ends and are engaged by transverse rollers 29. Transverse rollers 29 are mounted in rolling engagement with surfaces 25. Rollers 29 transmit pulling or pushing forces from frame 11 to the individual tool bars 10, depending upon whether frame 11 is being powered in a forward or rearward direction. The rollers 29 also vertically guide the front ends of the tool bars to move up and down along the guides 23. Upper and lower longitudinal vertical stabilizer rolls 41 engage surfaces 28 to transversely center the tool bars between guides 23.

The opposite or tail ends of the tool bars project between the rear sets of guides 24. Longitudinal vertical rolls 30 rotatably engage the upright longitudinal surfaces 26 to center each tool bar as it moves between guides 24. The longitudinal rollers 30 allow free up and down motion of the tool bars between guides 24 and permit slight longitudinal movement relative to frame 11 to prevent binding of the rollers against the respective guides.

A succession of ground working tools 12, as briefly discussed above, may be selectively mounted to the individual tool bars 10. The drawings show three sets of discs 31 mounted to each tool bar 10, along with depth wheels 27 and packing wheels 32. The discs 31 exemplify one form of ground working tools that can be used in conjunction with the present invention. Other tools presently used in cultivating, seed placement, fertilizing, etc. can also be used. The tool bars provide adequate support along their lengths for mounting a plurality of selected ground engaging tools arranged in an aligned row for sequential operations.

Means is provided between the frame and the individual tool bars for applying selected vertical forces against the tool bars. Such means may be in the form of cylinders 38 connected between the frame 11 and each tool bar at a point intermediate the tool bar ends. The cylinder bodies are upright and have upper ends pivotally anchored to frame 11 about a transverse axis 42. Piston shafts 39 extend from the cylinder bodies and are pivotably mounted to the tool bars 10 midway along their lengths by pins 40 (FIG. 3). The pins 40 define transverse axis about which the tool bars pivot. Extension of the cylinders causes downward forces to be applied against the tool bars and the tools mounted thereto to the extent of the combined weight of frame 11, tanks 20, and materials within the tanks. Retraction of cylinders 38 hoists the tool bars upwardly until they contact frame 11. In this situation, the ground working tools 12 are raised from the ground surface and are held in a storage or transport orientation.

In practice, each tool bar 10 serves as an independently suspended longitudinal walking beam free to float up and down in response to vertical forces applied to it. While such forces do result from soil penetration by the disks 31 or alternate tools and implements, the principal control forces result from ground contact by depth wheels 27 and packing wheels 32. These wheels are located at opposite sides of the cylinder connections 40 and balance one another as they engage the terrain beneath each tool bar.

The individual depth wheels 27 are the primary control for the walking beam action. They set the penetration depth of disks 31 by their elevational positions relative to the disks. Packing wheels 32 balance the depth wheels and also press upon the soil to force the open furrow closed. Additional packing pressure is provided by the transport wheels 21 described above.

FIGS. 4 and 5 illustrate the tool carrier as it moves over relatively rough terrain. FIG. 4 shows the tool bar and tool positions as the implements are drawn downwardly over a small mound. FIG. 5 shows the relationship of the tool bar and frame as the unit is drawn up one side of a small mound. In both instances, it is to be noted that the opposed wheels 27 and 32 remain in firm ground contact regardless of the terrain. This assures constant depth penetration by the individual working tools on the tool bars. The tool bars, it is noted, will "walk" over the mound as it is drawn along due to the free, floating mount between its opposed longitudinal ends.

It is noted that terrain can vary from one end of the elongated frame 11 to the other. Each end of the individual tool bars is free to move up or down as dictated by the terrain engaged by the tools mounted to it. Close, accurate contact of each tool with the ground surface will be maintained. Furthermore, the cylinders 38 can be operated in unison to produce an even biasing force against the tools without inhibiting free elevational movement along the individual tool bars.

The cylinders 38 allow free pivotal movement of the bars about the central transverse axes of the pins 40. Longitudinal pulling motion from the attached tractor is not directed to the tool bars through the piston shafts or cylinder bodies but through rolling connections between the front guides 23 and transverse rollers 29.

The above description and attached drawings are given by way of example to set forth a preferred from of the present invention. Other forms may be envisioned which fall within the scope of the attached claims.

What we claim is:

1. An agricultural tool carrier comprising:
   a ground-supported frame;
   front and rear upright guides fixed on said frame in longitudinally spaced positions along its intended direction of travel, said guides presenting upright surfaces;
   a longitudinally elongated single row tool bar mounted between the front and rear guides, said tool bar being aligned along the intended directions of travel of said frame;
   first means operably connected between said tool bar and one of said guides for transmitting longitudinal forces from the frame to said tool bar by engagement of said upright surfaces during frame travel;
   second means operably connected between said tool bar and each of said guides for vertically guiding the tool bar for elevational movement relative to the frame alongside each of said front and rear guides by engagement of said upright surfaces;
   a first ground-engaging wheel mounted to the tool bar at a location adjacent to the front guide; and
   a second ground-engaging wheel mounted to the tool bar at a location adjacent to the rear guide;
   power means operably connected between the frame and tool bar at a location between the first and second ground-engaging wheels for applying a selected vertical force against the tool bar.

2. An agricultural tool carrier as claimed in claim 1 wherein:
   said power means is comprised of a double acting hydraulic cylinder mounted in an upright orientation between the frame and the tool bar at the approximate center of the tool bar, said cylinder being selectively operable to lift or lower the tool bar relative to the frame.

3. An agricultural tool carrier comprising:
   a longitudinally movable ground-supported frame;
   a plurality of paired front and rear upright guides arranged in longitudinally spaced positions, each guide presenting upright surfaces;
   a plurality of longitudinally elongated single row tool bars movably mounted in side-by-side locations across said frame, each tool bar being arranged alongside one of said pairs of front and rear upright guides;
   first means operably connected between each tool bar and one of said guides alongside it for transmitting longitudinal forces from the frame to the tool bar by engagement of said upright surfaces during frame travel;
   second means operably connected between each tool bar and each of the guides alongside it for vertically guiding the tool bar for elevational movement relative to the frame by engagement of said upright surfaces;
   a first ground-engaging wheel mounted to each tool bar at a location adjacent to the front guide alongside it; and
   a second ground-engaging wheel mounted to each tool bar at a location adjacent to the rear guide alongside it; and
   individual power means operably connected between the frame and each tool bar for applying a selected vertical force against the tool bar at a location between the first and second ground-engaging wheels mounted to the tool bar.

4. An agricultural tool carrier as claimed in claim 3 wherein:
   said power means is comprised of a double acting hydraulic cylinder mounted in an upright orientation between the frame and the tool bar, said cylinder being selectively operable to lift or lower the tool bar relative to the frame.

* * * * *